June 8, 1948. H. C. BOWEN 2,442,886
MIXING VALVE CONTROL
Filed Jan. 31, 1944 3 Sheets-Sheet 1

INVENTOR.
HERBERT C. BOWEN
BY Maurice W. Green.

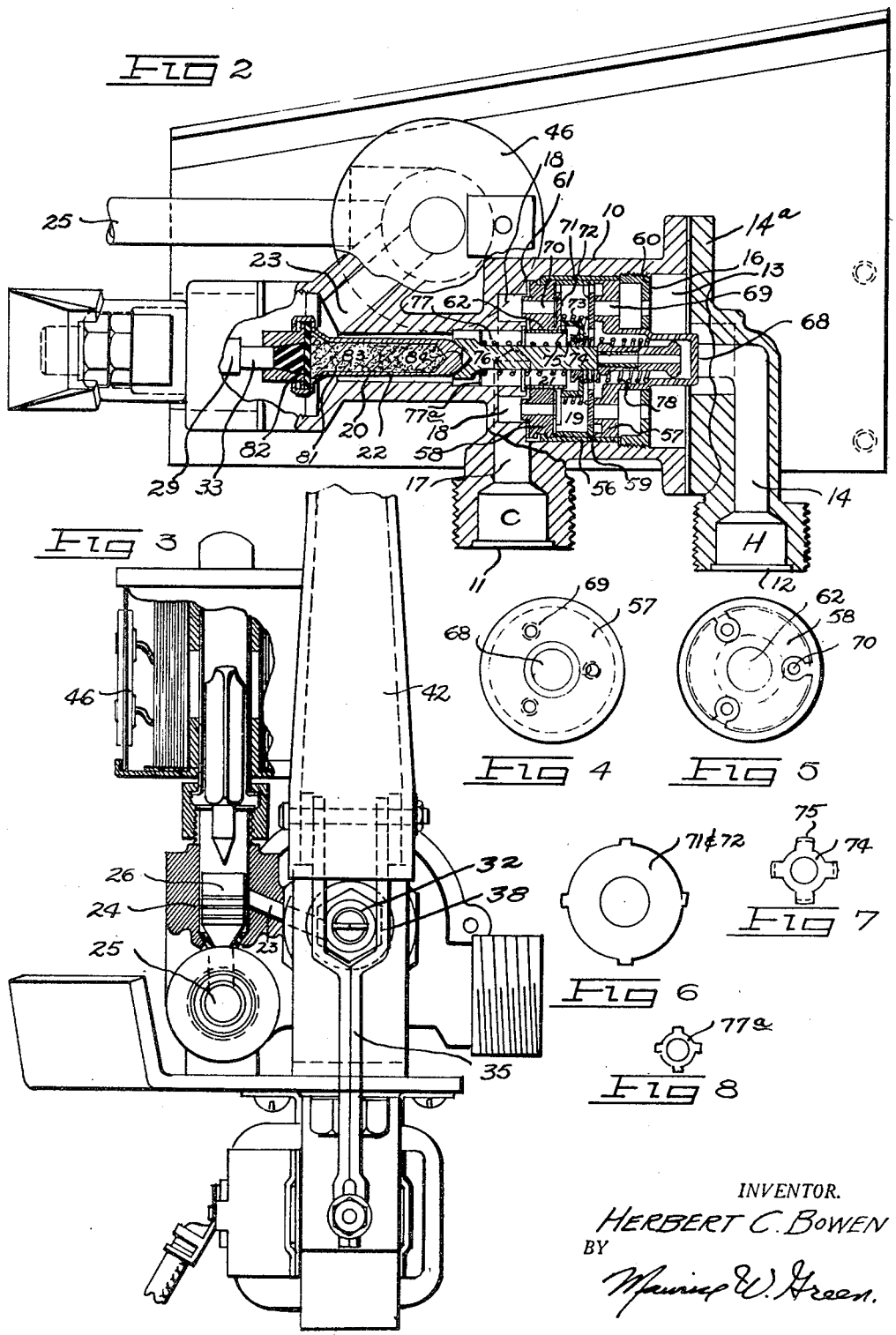

June 8, 1948.　　　　H. C. BOWEN　　　　2,442,886
MIXING VALVE CONTROL

Filed Jan. 31, 1944　　　　　　　　　　　　　　　3 Sheets-Sheet 3

Inventor:
HERBERT C. BOWEN
By: Maurice W. Green
Attorney.

Patented June 8, 1948

2,442,886

UNITED STATES PATENT OFFICE 2,442,886

MIXING VALVE CONTROL

Herbert C. Bowen, Cassopolis, Mich., assignor to Bendix Home Appliances, Inc., South Bend, Ind., a corporation of Delaware Application January 31, 1944, Serial No. 520,522

1 Claim. (Cl. 137—139)

This invention relates to a mixing valve control, the mechanism used for illustration being designed for mixing hot and cold liquids to desired temperatures for use in an automatic washing machine.

It has been customary in automatic washing machines to use controls and mixing valves designed to deliver water at two different temperatures. Some type of control actuated by an automatic timing mechanism has generally been used to actuate one or the other of two solenoid valves, one of these valves being so connected as to deliver water directly from the hot water supply line into the machine and the other solenoid operated valve has been generally designed as a mixing valve to deliver a mixture of hot and cold water thru a mixing valve controlled by some type of thermostatic element. However it is quite desirable that a more definite control be afforded for varying the hot water temperature as the use of hot water directly from the supply line is on many occasions both wasteful and injurious to fabrics. It would, therefore, be a very important advantage if without duplication of mechanism the hot water temperature could be controlled by passage through a mixing valve just as the lukewarm water is now controlled but at a higher temperature and further it would be an advantage if this higher temperature water could be varied in temperature by manual control which could be set to reduce the hot water from maximum value anywhere in the range down to the temperature of the lukewarm mixture without changing the setting of the automatic mechanism which would at another time produce water of lukewarm temperature when desired.

It is therefore a primary object of present invention to provide a mixing valve control which will make possible the use of a single thermostatic element and mixing valve to produce mixed water at a plurality of temperatures under controls suitable for automatic and selective actuation and further to provide for independent manual control of such temperatures.

It is another object of the present invention to provide a manual control for use with an automatic control which will allow a manual control to vary the temperature of the mixture produced at one automatic operation position without variation of the effect of controls which operate to position the unit to produce water of another temperature.

The above and other objects of the invention will appear more fully on consideration of the accompanying drawings and the following description, wherein:

Figure 2 is a top view of the unit partly in section showing the interior of the valve.

Figure 3 is an end view of the valve unit.

Figure 4 is a plan view of one of the end plates of the mixing valve unit showing valve ports serving as water inlets.

Figure 5 is a plan view of an opposite end plate from that shown in Figure 4.

Figure 6 is a plan view of one of the valve plate members used to control flow through the ports of the end plates shown in Figures 4 and 5.

Figure 7 is a plan view of a spider member with spaced fingers and a base member for contacting the valve plate members as shown in Figure 6.

Figure 8 is a plan view of a spring abutment member.

Figure 10:
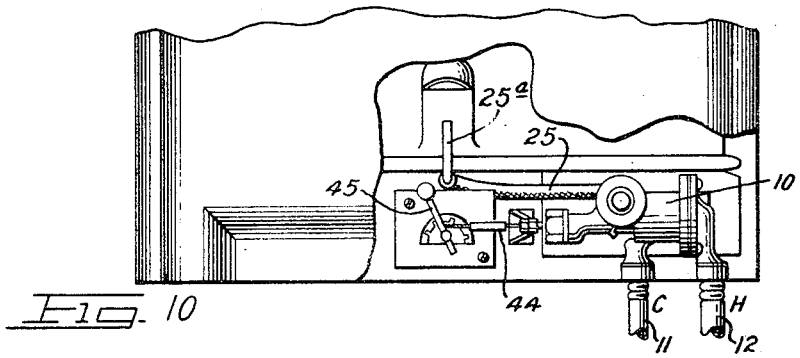
Figure 10 is a top-view of the machine and assembly of Figure 9.

According to the drawings the numeral 10 designates a valve body, cross-sectional view of Figure 2 showing a majority of the passage ways provided therein. In Figure 2 two water inlets from the supply lines are provided, a cold water inlet 11 and a hot water inlet 12, these inlets being also marked C and H respectively for convenience. Both of the inlets 11 and 12 are provided with suitable fittings for connection to any desired type of conduits for hot and cold water which may be provided, the ends of which are shown in Figure 10. The hot water inlet 12 is connected with a cylindrical chamber 13 through a drilled connection 14, the drilled connection and the inlet 12 being positioned in a cover 14a outside of the valve body or block 10 but suitably secured thereto and providing a sealed chamber capable of carrying liquid. The cylindrical chamber 13 is of sufficient size to retain a mixing valve unit 16, the hot water from the right hand end of the chamber 13 being available to supply the right hand end of the mixing valve unit 16 with hot water from the inlet 12. Cold water inlet 11 is also connected with the cylindrical chamber 13 but with the opposite end thereof, drilled conduits 17 and 18 being provided for this connection as will be observed on inspection of Figure 2. A mixing chamber 19 is provided in the central portion of the mixing valve unit 16 where the hot water and the cold water fed to the mixing valve unit from opposite sides thereof are mixed to the desired temperature, the mechanism for effecting this result being described more in detail hereinafter, but movement of a thrust pin 76 toward the right against resilience of a spring 78 will cause water of lower temperature to be produced while movement in the opposite direction will cause a mixture of increased temperature to be produced. The mixing chamber 19 is connected with mixed water chamber 20 through a central outlet 21. A thermostatic element 22 is positioned in the mixed water chamber 20 for the purpose of controlling the mixing valve unit 16 and said element 22 is so constructed that increase in temperature will produce increase in length and a movement of thrust pin 76 toward the right which reduces the mixed water temperature.

Referring to Figures 2 and 3, there is shown an outlet 23 from the mixed water chamber 20 which connects with a solenoid chamber 24 and also connects with a main outlet conduit 25 through solenoid operated valve 26. The mixed water chamber 20 has an enlarged portion 20A (Figure 1) at its outer end and has an interior thread to receive a fitting 27 which has a central bearing 28 carrying a shaft 29 for sliding movement therein. The pin 29 has two nuts 30, 31 on its outer end and a machine screw 32 forms a stop against the end of the fitting 27 thus adjustably limiting the sliding movement of the pin 29 which is normally urged toward the left by spring 78. The inner end of the pin 29 has a section 33 of smaller diameter which fits into the end of the thermostatic element 22. A suitable sealing gasket 34 is provided inside the fitting 27 surrounding the pin 29. The above described structure makes possible a sliding movement of the shaft 29 acting on the thermostatic element 22 and movement of such element toward the right against the spring 78 as shown in Figure 2 will cause the temperature responsive element and the mixing valve to produce water of colder temperature in the mixed water chamber 20 while movement of the pin 29 and element 22 toward the left as shown in the figure will cause water of higher temperature to be produced, the specific operation of the mixing valve and the structure thereof to produce this result will be described later, since the control for positioning the pin 29 and thermostatic element 22 are features of primary importance in the present invention, it being possible to use other and varied types of mixing valve assemblies with such control as will be evident.

Figure 1:
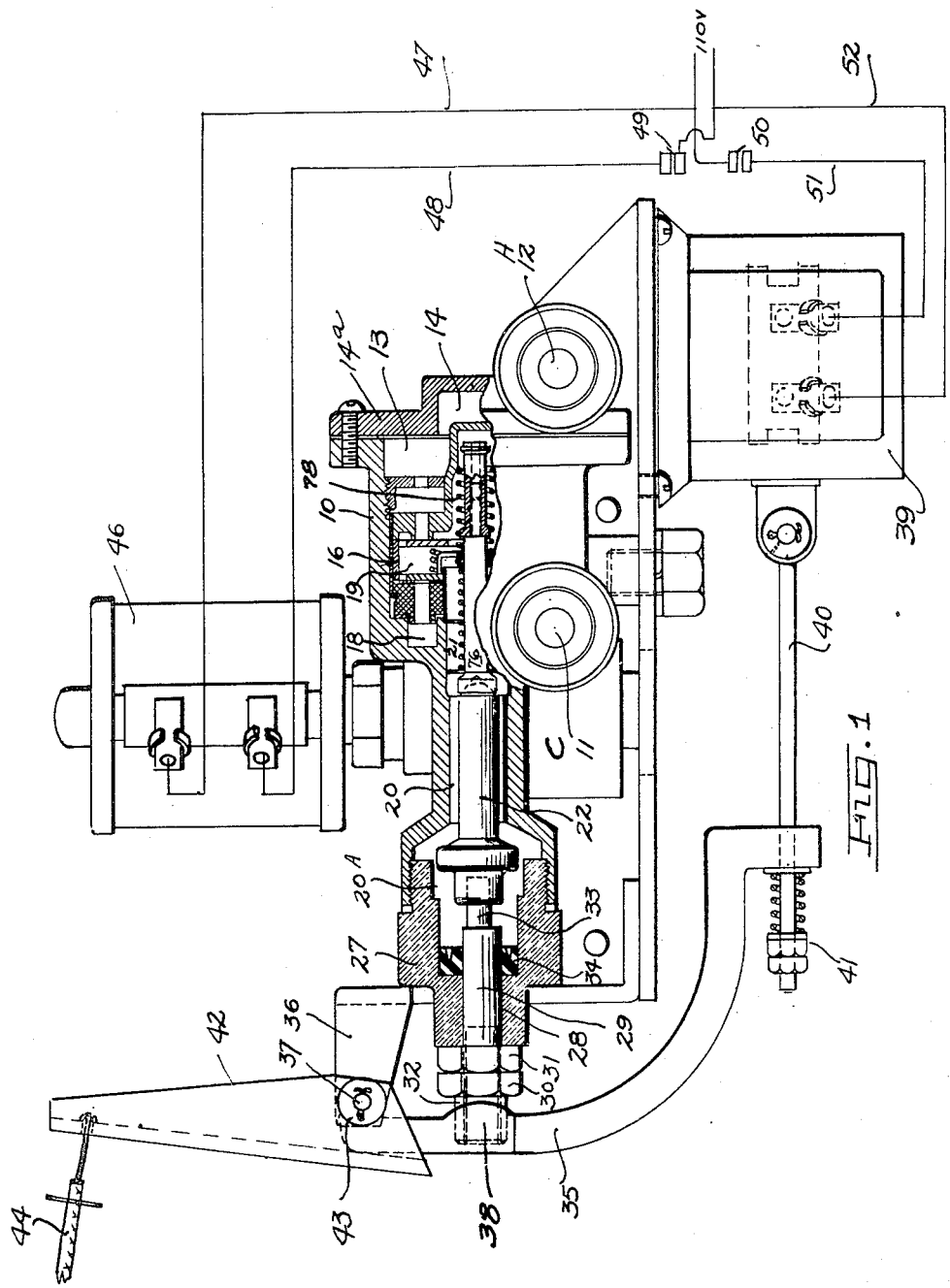
Figure 1 is a side view of the mixing valve and control unit.

For the purpose of actuating the shaft 29, a lever 35 is provided which is pivoted on a bracket 36 and a pin 37, the lever 35 being constructed with an abutment portion 38 surrounding the screw 32 and abutting against the nut 30 so that when the lever 35 is swung in a counter-clockwise direction, as shown in Figure 1, the result will be to push the shaft 29 and the thermostatic element toward the right as shown in the drawings thus causing the mixing valve 16 to deliver water of lower temperature into the mixed water chamber 20 while a release of the lever 35 will allow the spring actuation provided in the valve unit, later to be described, to push the thermostatic element and the pin 29 toward the left thus causing the mixing valve to deliver water of a higher temperature into chamber 20. For the purpose of automatic operation of the lever 35 at two positions, a solenoid 39 is mounted under the valve unit as shown in Figure 1 with a connecting rod 40 secured to the end of the lever 35 by means of suitable spring connection 41. It will be apparent on inspection of Figure 1 that when the solenoid 39 is actuated the lever 35 will be pulled to its maximum position in a counter-clockwise direction while when the solenoid 39 is deenergized the lever 35 will be free to seek its other and opposite position corresponding to the higher or "hot" water temperature as aforesaid.

For the purpose of providing a manual adjustment to vary the "hot" water temperature, a lever 42 formed as a channel and having a pivot opening 43 is positioned to swing on the pivot 37 (which is the same axis of pivot as provided for lever 35) and lever 42 is so shaped as to contact the upper end of the lever 35 so that when the lever 42 is swung in a counter-clockwise direction, it will contact the lever 35 and swing said lever 35 also in the same direction around the pivot 37 thereby pushing the shaft 29 and the thermostatic element 22 toward the right to produce a water of a colder temperature. Also when lever 42 is definitely positioned at any point it will act as a stop for limiting the travel of shaft 29 and associated parts by contact with the end of lever 35 which is below but near the pivot pin 37. For the purpose of actuating the lever 42 a suitable manual connection may be provided such as a push-pull connection 44 and hand-lever 45 such as shown in Figures 1 and 10.

Figure 9:
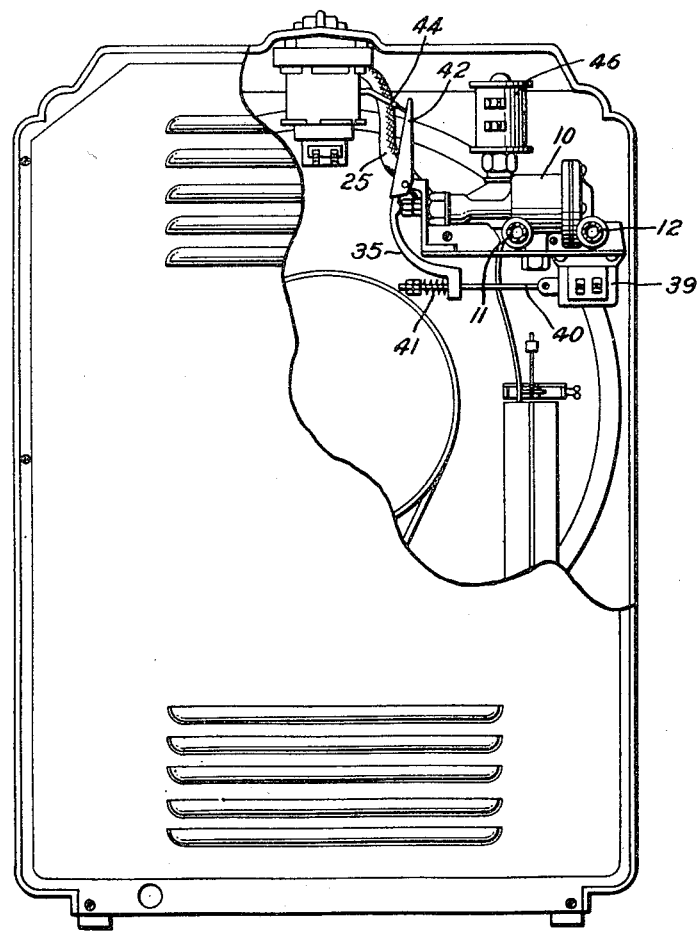
Figure 9 is a rear view of an automatic washing machine with the mixing valve and mixing valve control assembled thereon.

It is understood that the outlet 25 previously described is controlled by a solenoid unit 46 and that this solenoid unit is operated from any type of electrical connection such as lines 47 and 48 and a switch 49 while solenoid 39 is also actuated by a switch 50 and connections 51 and 52. The switches 49 and 50 being controlled by some type of cam driven mechanism such as a timer unit of the type disclosed in Patent No. 2,176,195 and, although not so limited, the mechanism herein disclosed is intended for use with an automatic washing machine of the type disclosed in Patent No. Re. 22,375. A mixing valve and the mixing valve control of this application are shown in position on an automatic washing machine in Figures 9 and 10. The cold and hot water supply lines at 11 and 12 are shown connected and a manual control 45 is shown at the top of the machine in the form of a hand lever actuating a push-pull flexible control 44 which is fastened to the end of lever 42. The outlet pipe 25 from the mixing valve is shown in Figure 10 as leading to a water inlet 25A for the tub of the washing machine. Such a device is disclosed more in detail in United States patent application Serial No. 485,563, now Patent Number 2,417,908, filed in the name of Myron W. Bowen and assigned to the same assignee as this application.

It is understood that in carrying out this invention various types of mixing valve units might be used to perform the functions of valve unit 16 and still be operable by a control having the novel features herein disclosed. However, for the purpose of illustration herein and to provide description of a complete and operable structure one type of mixing valve is here illustrated and described, the mixing valve unit 16 being shown in cross-section in Figure 2 for that purpose. It is to be understood however that I do not represent the detail structure of mixing valve unit 16 as my invention and I am informed that a United States patent application Serial No. 468,038, now Patent Number 2,381,146, has been filed in the name of Adolf Von Wangenheim on December 7, 1942, disclosing such structure.

The mixing valve unit 16 is housed in a tubular casing 56 having end plates 57 and 58, the tubular casing 56, together with a spacer 59, serving to space the two end plates 57 and 58. A sleeve nut 60 is screw-threaded into the cylindrical chamber 13 and bears against one end of the mixing valve unit 16 to hold it tightly against a shoulder 61, a sealing washer preferably being carried by the shoulder. The end plate 58 is annular and has a central aperture 62 therethrough.

The end plate 57 has a central tubular extension 68 closed at its outer end. Through the plate 57 there are a plurality of valve ports 69, which are preferably equally spaced from each other and of which only one is shown in Figure 4. Through the end of the plate 58 there are likewise provided a plurality of valve ports 70. Within the mixing chamber 19 there is a pair of annular valve plate or disk members 71 and 72, which members are of identical construction, each having a plurality of radial fingers or ears for guiding the valve plates within the spacer 59, and so that liquid passing through ports 69 and 70 can have access to the mixing chamber 19. Positioned between the valve plates 71 and 72 there is a helical coil spring 73 which has its ends seating against the valve plates 71 and 72 and which urges the valve plates into closing engagement with the ports 69 and 70.

Also positioned between the valve plates 71 and 72 there is an abutment member in the form of a spider having an annular flange or base portion 74 and spaced fingers 75 which seat on and limit the extent of movement of the valve plate 71. The base portion 74 of the spider is engageable with and is positioned to limit the opening movement of the valve plate 72. The spider member with its parts 74 and 75 is secured to slide on a thrust pin 76, and is normally urged to its maximum right-hand position by a coil spring 77 which surrounds the thrust pin 76. An abutment member 77a shown in Figure 2 and in plan view in Figure 8 serves as an abutment for spring 77 its shape allowing flow of liquid therearound into chamber 20. The spider member fingers 75 are urged toward and normally seat the valve plate 71 on the end plate 58 under the force of a coil spring 78, which is positioned within the recess of the end wall extension 68.

Supported and guided on the member 33 there is the previously mentioned temperature-responsive or thermostatic element 22 having a hollow tubular force-transmitting member or plunger 81, the bore of which is closed by a resilient flexible diaphragm member 82, thereby providing an expansible, contractible chamber. This chamber is filled with a temperature-responsive medium 83, which may be a material such as wax. The upper or free end portion 84 of the plunger 81 is preferably of truncated conical form to fit cooperatively within a conical recess in the end portion of the thrust pin 76.

The operation of the mixing valve of the above type, such as 16, assuming that there is available on opposite sides of the unit a hot water supply such as afforded from the inlet 12 on the right-hand end, and a cold water supply such as afforded by the inlet 11 on the left-hand end as viewed in Figure 2, is as follows:

Let it be assumed that a valve is opened which will take tempered hot water from the chamber 20; and with the valve in the position as shown hot water will enter by the inlet 12 and into the right-hand end of the chamber 13. The pressure of the hot water from its supply line acting through the ports 69 on the valve plate 72 will compress the spring 73, so that the plate 72 will raise off its seat sufficiently to allow hot water to enter the central mixing chamber 19, provided however that temperature in chamber 20 is such as to position the expansive element 83 to locate base portion 74 away from plate 72. Since the chamber 19 is, through its central communicating outlet 21 and spaces between spider fingers 75, in communication with the mixed water chamber 20, the hot water thus admitted will flow directly into the chamber 20. However, the hot water will cause an expansion of the temperature-responsive material 83 until the thrust pin 76 is moved toward the right, as viewed in Figure 2. The valve plate 71, which controls the entry of cold water to the central mixing chamber 19, will be closed under the force of springs 73 and 78 until sufficient movement of the thrust pin 76 is exerted to overcome the spring 78; and when this occurs the plate 71 will lift off its seat and allow cold water to enter the mixing valve at 19. The cold water thus admitted will temper the hot water admitted to chamber 19 and the mixed water will then discharge through the central opening 21 into the mixed water chamber 20, the cold water being admitted until change in temperature causes sufficient movement of the pin 76 and connected parts to prevent opening movement of plate 71. Should the temperature-responsive material 83 have its temperature increased to a point beyond that at which the base portion 74 of the spider acts to seat the valve plate 72, then the thrust pin member 76 can have continued movement toward the right, as viewed in Figure 2, against the resisting force of the lost motion spring 77 so that the parts of the mixing valve will not be injured by excessive movement of pin 76 brought about by high temperatures and excessive expansion of the temperature-responsive material 83.

The mixing valve unit 16 and the thermostatic element 22 above described are selected merely as illustrative of units which might be used to accomplish the desired results, and the specific construction thereof is not claimed as new or novel in this application. It would be sufficient for the purpose if any mixing valve were substituted for 16 which had an operating member similar to 76 which when moved in one direction would tend to produce water of a colder temperature or when moved in the opposite direction would tend to produce water of a higher temperature mixed from two inlets such as the cold inlet 11 and the hot inlet 12. Preferably such operating member should be resiliently mounted to act against a spring such as spring 78, or mechanical equivalents thereof. Likewise the thermostatic element 22 might be any type of thermo-responsive member which could be supported by a member such as the member 33 but of such length as to contact the extending end of the mixing valve member 76 and when placed in the chamber 20 would expand on increasing temperature in such chamber to move the member 76 against its resilient mounting to decrease the mixed water temperature of water admitted to such chamber and such element would contract on decreasing temperature to allow member 76 to move in a direction to increase the mixed water temperature.

Important features of the device claimed in this application are shown in Figure 1 and comprise the control mechanism, the important parts of which are shown in the left-hand and bottom portion of Figure 1. The operation of this novel control mechanism is as follows:

As the parts are shown in Figure 1 the solenoid 39 is actuated to swing the lever 35 to its maximum position toward the right and the shaft 29 and the projecting member 33 are thus pushed to their maximum position toward the right with adjusting nut 31 acting as a stop the spring and adjustment at 41 assuring that sufficient movement may be obtained to bring the parts against such a stop. The thermostatic element 22 is thus held in that maximum position which will produce water of a temperature which is generally termed "lukewarm" or "rinse" water. At the time that any water is desired to be delivered, suitable controls for the switch 49, as previously mentioned, close that switch and actuate the solenoid 46 which opens the valve into the outlet 25 thus calling for water to be delivered out from the mixed water chamber 20. Assuming that the solenoid 39 is actuated as shown in Figure 1 the result will then be a water temperature for lukewarm water controlled by the temperature responsive element 22. A manual setting and adjustment of this temperature may be obtained by varying the position of the nuts 30 and 31. However, assuming that at another point in the cycle of operation of the machine it is desired to have water of a higher fixed temperature automatically produced, the solenoid 39 will be released from operation and the spring action of the spring in the mixing valve such as spring 78 will cause the entire thermostatic assembly 22 together with the shaft 29 and the lever 35 to swing and move to the maximum position toward the left as viewed in Figure 1 and coming to rest in a definite position as limited by the configuration of the several parts, the inside of channel lever 42 acting as a stop. This position of the mechanism will produce a higher temperature water or so-called "hot" water and if the manual control lever 42 is in its maximum position, clockwise as viewed in Figure 1, this will be the maximum temperature which can be obtained from the unit; however, if it is desired that a lower temperature be produced by this so-called automatic operation, the manual control 44—45 may be actuated to move the lever 42 the desired amount in a counter-clockwise direction thus to push the assembly 22—29 toward the right as viewed in Figure 1 and thus cause water of lower temperature to be delivered. It is thus possible by the mechanism shown to produce a manually controlled variation of the hot water temperature without varying the lukewarm water temperature which will subsequently be produced on actuation of the solenoid.

Although I have described my invention by reference to a specific structure found to be practical in actual operation, it is evident that various modification and mechanical equivalents may be used while retaining the important and novel fundamental features of my invention, I therefore do not desire to limit myself to the structure herein disclosed but rather by the scope of the following claim.

I claim:

A mixing valve control comprising an actuating lever, resilient means normally urging said lever in one direction of movement, a second lever having a portion thereof contacting said first lever, connections from said first lever to said mixing valve, a solenoid mounted to move said first lever to a position in a direction against said resilient means, and manually adjustable positioning means for limiting the movement of said first lever thereby causing said second lever to act as a stop for the movement of said first lever in the direction urged by said resilient means.

HERBERT C. BOWEN.

REFERENCES CITED

The following references are of record in the file of this patent:

UNITED STATES PATENTS

| Number | Name | Date |
|---|---|---|
| Re. 20,836 | Wall | Aug. 30, 1938 |
| 1,594,021 | Smith | July 27, 1926 |
| 1,597,773 | Dodge | Aug. 31, 1926 |
| 1,787,304 | Becker | Dec. 30, 1930 |
| 2,079,397 | Beauregard | May 4, 1937 |
| 2,207,865 | Knight | July 16, 1940 |
| 2,327,366 | Nampa | Aug. 24, 1943 |

FOREIGN PATENTS

| Number | Country | Date |
|---|---|---|
| 234,563 | Great Britain | June 4, 1925 |